United States Patent [19]
Chu et al.

[11] Patent Number: 6,023,410
[45] Date of Patent: Feb. 8, 2000

[54] EXTENDED COOLING FOR PORTABLE COMPUTERS

[75] Inventors: Richard C. Chu, Poughkeepsie, N.Y.; Gregory M. Chrysler, Chandler, Ariz.

[73] Assignee: International Business Machines Corporation, Armonk, N.Y.

[21] Appl. No.: 09/052,432

[22] Filed: Mar. 31, 1998

[51] Int. Cl.[7] ................................ G06F 1/16; G06F 1/20
[52] U.S. Cl. .................... 361/681; 361/687; 361/690; 361/707
[58] Field of Search .................... 361/681, 687, 361/690, 704, 688, 707, 710, 807, 809; 364/708.1; 248/917, 918, 919

[56] References Cited

U.S. PATENT DOCUMENTS

| | | |
|---|---|---|
| 4,980,848 | 12/1990 | Griffin et al. . |
| 5,260,885 | 11/1993 | Ma . |
| 5,381,043 | 1/1995 | Kohiyama et al. . |
| 5,552,960 | 9/1996 | Nelson et al. . |
| 5,666,261 | 9/1997 | Aguilers ................................ 361/681 |
| 5,774,333 | 6/1998 | Janik et al. ............................ 361/687 |
| 5,777,704 | 7/1998 | Selker ..................................... 361/681 |

OTHER PUBLICATIONS

Buller et al., "Thermally Conductive Hinge for Notebook Computers," IBM Technical Disclosure Bulletin vol. 39, No. 05, May 1996, pp. 227–229.

*Primary Examiner*—Leo P. Picard
*Assistant Examiner*—John D. Reed
*Attorney, Agent, or Firm*—Lawrence D. Cutter

[57] ABSTRACT

A notebook or laptop style computer includes a visor which is attached to an upper edge of the screen. This visor includes electrical circuit components which typically have higher thermal load demands. The visor provides a mechanism for cooling these chips, particularly microprocessor chips. The system provides two related advantages, the first being placement of hot components in an area which is ideal for convective and radiational cooling. A second advantage is the removal of these components from the base unit which now contains other circuit components which are not subjected to high temperatures due to the presence of the components which have been removed and placed in or on the visor.

8 Claims, 1 Drawing Sheet

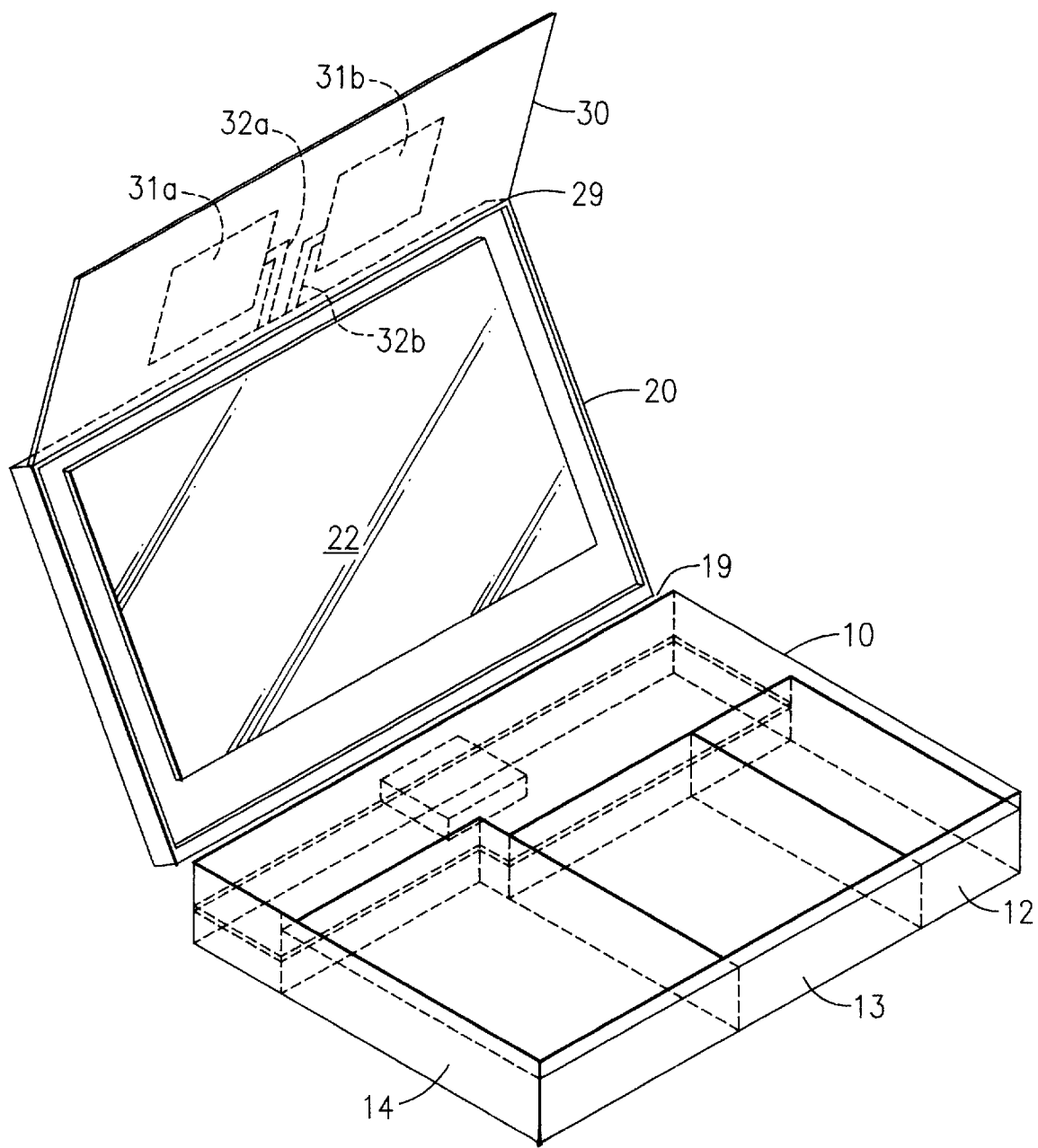

EXTENDED COOLING FOR PORTABLE COMPUTERS

BACKGROUND OF THE INVENTION

The present invention is generally directed to a cooling device and system for use in conjunction with portable computing devices especially laptop and notebook personal computers. More particularly, the present invention is directed to the inclusion of a visor which is hinged to the computer display screen for the placement and cooling of electrical components which tend to run hotter than other components which typically occurs because their power dissipation is a function of operating frequency.

Notebook and laptop computers are increasingly including microprocessor designs which produce significant amounts of heat during operation. In particular, it is noted that the thermal energy dissipated by such devices increases approximately as the second power of the voltage and as the first power of frequency. Thus, a doubling in frequency results in a four-fold increase in power. Nonetheless, the demand for increasingly fast operation speeds requires the utilization of microprocessor devices which run at higher and higher frequencies. Accordingly, demand for increased processing capabilities for these chips means that thermal energy dissipation requirements will undoubtedly increase.

Nonetheless, it is seen that the typical placement for thermally critical microprocessor and memory components in a notebook or laptop-type personal computer is within the base unit of the machine itself. These base units are already crowded with various components including a keyboard and numerous peripheral devices such as hard disk drives (removal and non-removable), floppy disk drives, CD-ROM drives, batteries and PC cards (formerly called PCMCIA cards). Placement of microprocessor components in such areas makes cooling difficult particularly since these components are packed very compactly in notebook and laptop PC designs. Furthermore, there is little opportunity for ventilation for such devices within the base units.

While one solution to the problem posed above is the placement of certain circuit components in the screen portion of a notebook or laptop computer, it is nonetheless noted that the typical liquid crystal display (LCD) screen used for such portable computing devices is sensitive in its operation to temperature. Accordingly, placement of such devices in the screen might cause local variations in screen images which is not a desirable characteristic.

SUMMARY OF THE INVENTION

In accordance with a preferred embodiment of the present invention, a portable computer comprises a base unit which includes a keyboard together with a substantially flat display screen which is attached to a rear portion of the base unit. Furthermore, in accordance with the present invention, there is also provided a visor which is attached to the display screen along the (other) top edge of the screen. The visor contains circuit chips which are capable of transferring heat to the visor for purposes of cooling. Conventional, flexible conductor mechanisms are employed to link the circuit chips disposed on or within the visor to other circuits in the base unit and/or in the screen portion of the portable computer. The visor is attached to the display screen via any convenient hinge mechanism including friction hinges. In preferred embodiments of the present invention, the circuit chips disposed on the visor portion are the thermally critical chips, notably, high-frequency processor units.

Accordingly, it is an object of the present invention to provide improved cooling mechanisms for laptop, notebook and/or other portable computing devices.

It is yet another object of the present invention to provide a mechanism which permits operation of critical computer components at higher frequencies so as to thereby improve operational performance.

It is a still further object of the present invention to provide a visor for use in conjunction with a laptop or notebook computer which also functions as a sun screen or light screen.

It is also an object of the present invention to permit the placement of high-heat-producing electrical circuit elements in locations not requiring mechanical ventilation assistance.

It is yet another object of the present invention to dispose processor and other high-thermal-load-producing circuits in locations that are not confined.

It is yet another object of the present invention to provide a visor for use in conjunction with a notebook or laptop computer screen which takes advantage of naturally occurring convection.

It is also an object of the present invention to prevent the operation of internal notebook or laptop computer components at undesirably high temperatures.

It is a still further object of the present invention to eliminate the need for battery-draining fan or other air-moving devices to provide internal notebook or laptop computer cooling.

Lastly, but not limited hereto, it is an object of the present invention to prevent excessively hot outer surface temperatures from occurring in laptop and/or computer devices.

BRIEF DESCRIPTION OF THE DRAWING

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawing in which:

The FIGURE shown is an isometric view illustrating the construction of a notebook or laptop size personal computer in conjunction with the visor mechanism of the present invention.

DETAILED DESCRIPTION OF THE INVENTION

The FIGURE included herewith illustrates, in an isometric view, a notebook PC (personal computer) including a visor in accordance with the present invention. In particular, there is shown base unit 10 which includes one or more bays 12, 13 and 14 which accept one or more of the following peripheral devices: hard drives, floppy disk drives, CD-ROM drives, PC cards and/or batteries. For purposes of clarity, the keyboard element per se is not illustrated. Attached to base unit 10 is display screen 20 having viewable area 22. Display screen 20 typically comprises a liquid crystal display device. Such devices are currently economical and are relatively low in power demand for view devices used with portable PC units. Display screen 20 is attached to base unit 10 via hinge 19 which may comprise or include any convenient mechanism for pivoting display screen 20 along an axis essentially defined by the common edges of display screen 20 and base unit 10. Such hinges are well known in the notebook arts.

With particular reference to the present invention, there is also provided visor 30 which includes on or within itself electronic circuit chips 31*a* and 31*b* which are connected via printed circuit wiring and flexible cable to display screen 20 and/or to base unit 10 via wires 32a and 32b, respectively. Visor 30 preferably comprises a thermally conductive material such as aluminum but, clearly, a layer of insulated material is disposed between any wiring and the aluminum panel or container that comprises visor 30. Visor 30 is attached to the upper (top) portion of display screen 20 via hinge 29 which may be constructed similarly to hinge 19. In preferred embodiments of the present invention, visor 30 folds down along hinge 29 to lie flat against viewing area 22 when the unit is not in operation. Likewise, in those circumstances, display screen 20, with visor 30 folded into the recess shown therein, also lies flat against base unit 10 to preferably form an overall flat monolithic rectangular structure.

In preferred embodiments of the present invention, electronic circuit chips 31a and 31b are microprocessor chips and/or chips which generate significant amounts of thermal energy during their operation. Likewise, it is possible to characterize the electronic circuit chips that one would dispose on visor 30 as being chips which generate more heat when operated at higher frequencies.

Hinges 19 and 29 comprise conventional hinge structures well known in the notebook and laptop computer arts. Likewise, cabling conductor means which links display screen 20 with electronic components in base unit 10 are well known in the art and, accordingly, similar flat flexible cabling means are employed for connecting circuit components disposed on or within visor 30 to either display screen 20 or to other electronic components in base unit 10 particularly to a computer bus. Furthermore, while the electronic circuit chips disposed on or within visor 30 are described above as being microprocessor chips, other chips may also be employed including memory chips and/or video display chips. As indicated above, the components disposed on visor 30 are preferably those which require operation at higher frequencies and/or at higher thermal energy densities. They are not, however, required to be such chips.

From the above, it should be appreciated that all of the objectives recited above have been met by the structure shown in applicants' FIGURE.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A portable computer comprising:

a base unit including a keyboard;

a substantially flat display screen attached to a rear portion of said base unit via a first hinge means;

a visor attached to said display screen via a second hinge means along an edge of said screen opposite said first hinge means, said visor containing at least one circuit chip which is capable of transferring heat to said visor for cooling said chip; and flexible conductor means linking said at least one electrical circuit chip in said visor to electrical or electronic components in said screen or in said base unit.

2. The portable computer of claim 1 further including at least one bay for a removal peripheral device selected from the group consisting of hard disk drives, floppy disk drives, CD-ROM drives, batteries and PC cards.

3. The portable computer of claim 1 in which said at least one electrical circuit chip is a microprocessor chip.

4. The portable computer of claim 1 in which said display is a liquid crystal display.

5. The portable computer of claim 1 in which said chips are devices which dissipate more power at higher operating frequencies.

6. The portable computer of claim 1 in which said visor comprises thermally conductive material.

7. The portable computer of claim 1 in which said visor, screen and base unit fold together in a flat stack.

8. The portable computer of claim 1 in which said visor is opaque, whereby it also serves as a sun or light shield.

* * * * *